(12) United States Patent
Massicot et al.

(10) Patent No.: US 10,179,471 B2
(45) Date of Patent: Jan. 15, 2019

(54) METHOD OF MARKING A HOLOGRAPHIC MATRIX AND HOLOGRAPHIC MATRIX PRODUCED BY THIS METHOD

(71) Applicant: ADVANCED TRACK AND TRACE

(72) Inventors: Jean-Pierre Massicot, Rueil-Malmaison (FR); Alain Foucou, Rueil-Malmaison (FR); Zbigniew Sagan, Rueil-Malmaison (FR)

(73) Assignee: ADVANCED TRACK & TRACE, Rueil-Malmaison (FR)

( * ) Notice: Subject to any disclaimer, the term of this patent is extended or adjusted under 35 U.S.C. 154(b) by 364 days.

(21) Appl. No.: 15/121,760

(22) PCT Filed: Feb. 27, 2015

(86) PCT No.: PCT/EP2015/054208
§ 371 (c)(1),
(2) Date: Aug. 25, 2016

(87) PCT Pub. No.: WO2015/132162
PCT Pub. Date: Sep. 11, 2015

(65) Prior Publication Data
US 2017/0066278 A1    Mar. 9, 2017

(30) Foreign Application Priority Data
Mar. 3, 2014 (FR) ..................... 14 51697

(51) Int. Cl.
*B42D 25/328* (2014.01)
*B42D 25/324* (2014.01)
(Continued)

(52) U.S. Cl.
CPC ......... *B42D 25/328* (2014.10); *B42D 25/324* (2014.10); *B42D 25/41* (2014.10);
(Continued)

(58) Field of Classification Search
CPC .... B42D 25/328; B42D 25/324; B42D 25/41; B42D 25/425; G07D 7/0013; G07D 7/2033; G07D 7/0033; G06K 19/16
(Continued)

(56) References Cited

U.S. PATENT DOCUMENTS 6,946,619 B2 * 9/2005 Troitski .................... B44F 1/06
219/121.68
7,684,088 B2 * 3/2010 Jordan .................. G07D 7/0056
358/3.28

(Continued)

FOREIGN PATENT DOCUMENTS

FR          2 915 600 A1    10/2008
WO       2007/088288 A1     8/2007

*Primary Examiner* — Samuel M Heinrich
(74) *Attorney, Agent, or Firm* — PatShegen IP; Eva Taksel

(57) ABSTRACT

A method of marking a holographic matrix. The method includes forming the holographic matrix, which is designed to produce holograms by printing. At least one anti-copy mark on the holographic matrix is formed and at least one copy-robust mark on the holographic matrix is formed. At least one of the steps for forming at least one mark on the holographic matrix uses laser-structuring of the holographic matrix surface. Preferably, the anti-copy mark represents a message and a plurality of redundancies of the message carried by the anti-copy mark. Also, preferably, a picosecond laser is used to form the anti-copy mark is formed.

11 Claims, 2 Drawing Sheets

(51) Int. Cl.
*B42D 25/41* (2014.01)
*B42D 25/425* (2014.01)
*G07D 7/00* (2016.01)
*G07D 7/2033* (2016.01)
*G06K 19/16* (2006.01)
*G07D 7/0047* (2016.01)

(52) U.S. Cl.
CPC ........... *B42D 25/425* (2014.10); *G06K 19/16* (2013.01); *G07D 7/0032* (2017.05); *G07D 7/0047* (2017.05); *G07D 7/2033* (2013.01)

(58) Field of Classification Search
USPC ....................................... 219/121.68, 121.69
See application file for complete search history.

(56) References Cited

U.S. PATENT DOCUMENTS

| 8,055,910 | B2* | 11/2011 | Kocher | G06F 21/10 |
| | | | | 280/228 |
| 8,345,315 | B2* | 1/2013 | Sagan | H04N 1/32154 |
| | | | | 358/3.28 |
| 8,392,715 | B2 | 3/2013 | Massicot et al. | |

* cited by examiner

METHOD OF MARKING A HOLOGRAPHIC MATRIX AND HOLOGRAPHIC MATRIX PRODUCED BY THIS METHOD

RELATED APPLICATIONS

This application is a § 371 application from PCT/EP2015/054208 filed Feb. 27, 2015, which claims priority from French Patent Application No. 14 51697 filed Mar. 3, 2014, each of which is incorporated herein by reference in its entirety.

TECHNICAL FIELD OF THE INVENTION

The present invention concerns a method of marking a holographic matrix and a holographic matrix produced thereby. It applies, in particular, to manufacturing security documents and cards—for identification or payment—carrying a hologram.

STATE OF THE ART

There are many known ways of protecting content or a message carried on a medium. For example, encoding or encryption is applied to the data making up this message. However, simply knowing the decoding or decryption key makes it possible to access the message. Yet, these keys must be stored on media, e.g. paper, plastic or electronic, or on servers. Irrespective of whether these keys are carried by the user or stored in a computer system, a malicious third party with the right tools can reach them.

These protections are therefore inadequate.

SUBJECT OF THE INVENTION

The present invention aims to remedy all or part of these drawbacks.

To this end, according to a first aspect, the present invention envisages a method for marking a holographic matrix, which comprises:
- a step of forming the holographic matrix, which is configured to produce holograms by printing;
- a step of forming at least one anti-copy mark on said holographic matrix; and
- a step of forming at least one copy-robust mark on said holographic matrix;
- at least one of the steps of forming at least one mark on said holographic matrix implementing a laser holographic matrix surface structuring.

Thanks to these provisions, a holographic matrix whose copying can be detected, that carries a message, is formed, and wherein the holograms made from it also enable copies thereof to be detected.

In some particular embodiments, the anti-copy mark represents a message and a plurality of redundancies of the message carried by the anti-copy mark.

In some particular embodiments, during the step of forming the anti-copy mark, a picosecond laser is implemented.

In some particular embodiments, each anti-copy mark formed on the holographic matrix comprises cells and has an error rate, which is unpredictable cell by cell, greater than five percent, compared to the corresponding digital anti-copy mark.

In some particular embodiments, during the step of forming at least one robust mark, for each said robust mark, a message carried by said robust mark represents an item of information extracted from an image of at least one anti-copy mark.

In some particular embodiments, the message carried by said robust mark represents a unique identification of at least one anti-copy mark.

In some particular embodiments, the message carried by said robust mark represents an item of information representative of at least two anti-copy marks or of their respective positions.

In some particular embodiments, each robust mark surrounds an anti-copy mark.

In some particular embodiments, the shape of the hologram, or the message carried by the hologram represented by the holographic matrix during the holographic matrix formation step depends on a message carried by the anti-copy mark or by the robust mark.

According to a second aspect, the present invention envisages a holographic matrix obtained by implementing the method that is the subject of the present invention.

As the features, advantages and aims of this holographic matrix are similar to those of the method that is the subject of the present invention, they are not repeated here.

BRIEF DESCRIPTION OF THE FIGURES

Other advantages, aims and particular features of the present invention will become apparent from the description that will follow, made, as a non-limiting example, with reference to drawings included in an appendix, wherein.

DESCRIPTION OF EXAMPLES OF REALIZATION OF THE INVENTION

It is now noted that the figures are not to scale.

Figure 1:
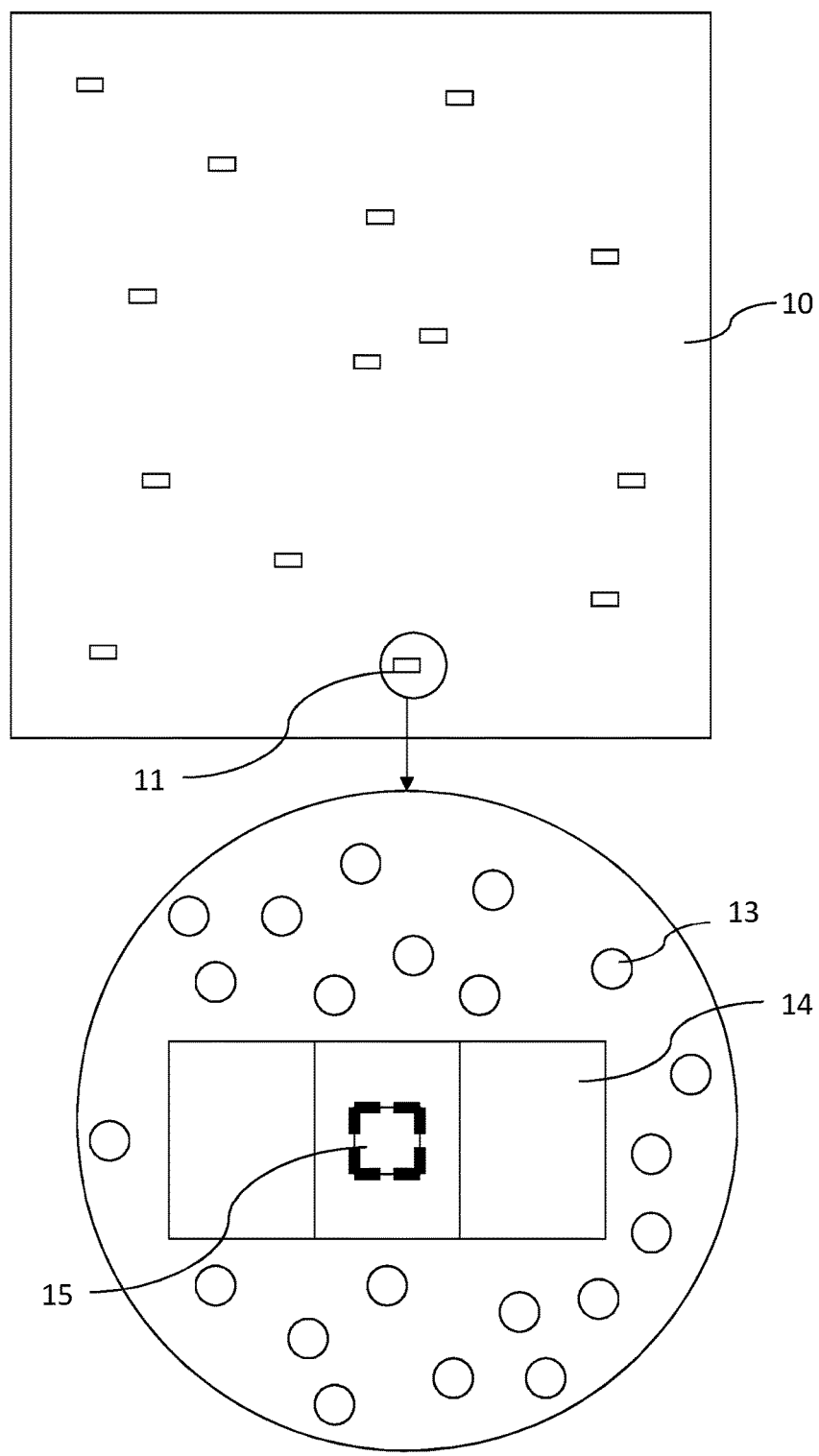
FIG. 1 represents, schematically, a particular embodiment of a holographic matrix device that is the subject of the present invention

FIG. 1 shows a holographic matrix ("shim") 10, carrying marks 11, which are rectangular for the case illustrated in FIG. 1. A partial enlargement, represented at the bottom of FIG. 1, shows that a mark 11 is surrounded by holographic elements 13 and comprises two zones:
- a high-capacity zone 14, robust to copying and printing of holograms, representing a first message; and
- a lower-capacity zone 15, intended to detect a copy and fragile when a hologram is printed, representing a second message comprising a high number of redundancies.

The zones 14 and 15 take the general form of dot matrices. In some embodiments, each dot of each matrix can only be in one of two states, e.g. two polarization orientations or two different colors.

For example, from the first printing of a hologram, the rate of error cells of the anti-copy matrix 15 is above five percent and preferably above ten percent. An error cell is a cell that, on over more than half of its surface, has an error state compared to the original digital matrix with which the holographic matrix was produced. An error cell comes from a print error, unpredictable cell by cell, due to physical limitations of the printing means, in particular in terms of resolution. Thus, the errors are similar to noise, with the signal being formed from the content of the original digital matrix.

The rate of redundancies in the anti-copy matrix 15 is above five and preferably above ten, so as to correct an error rate above forty percent, after making copies of the original hologram. It is noted here that each copy increases the rate of error cells. It is determined whether a document and the hologram this document carries is the original or a copy, by measuring this error rate by capturing an image of the zone 15, and by counting the number of redundancies used to correct these errors and obtaining the second message,
 comparing the captured image to a scaled digital matrix; or
 comparing the captured image to an image stored in memory and captured at the time the hologram was made;

and by comparing this error rate to a predefined limit value, e.g. ten percent, preferably fifteen percent, of additional error cells compared with the printed original.

Figure 2:
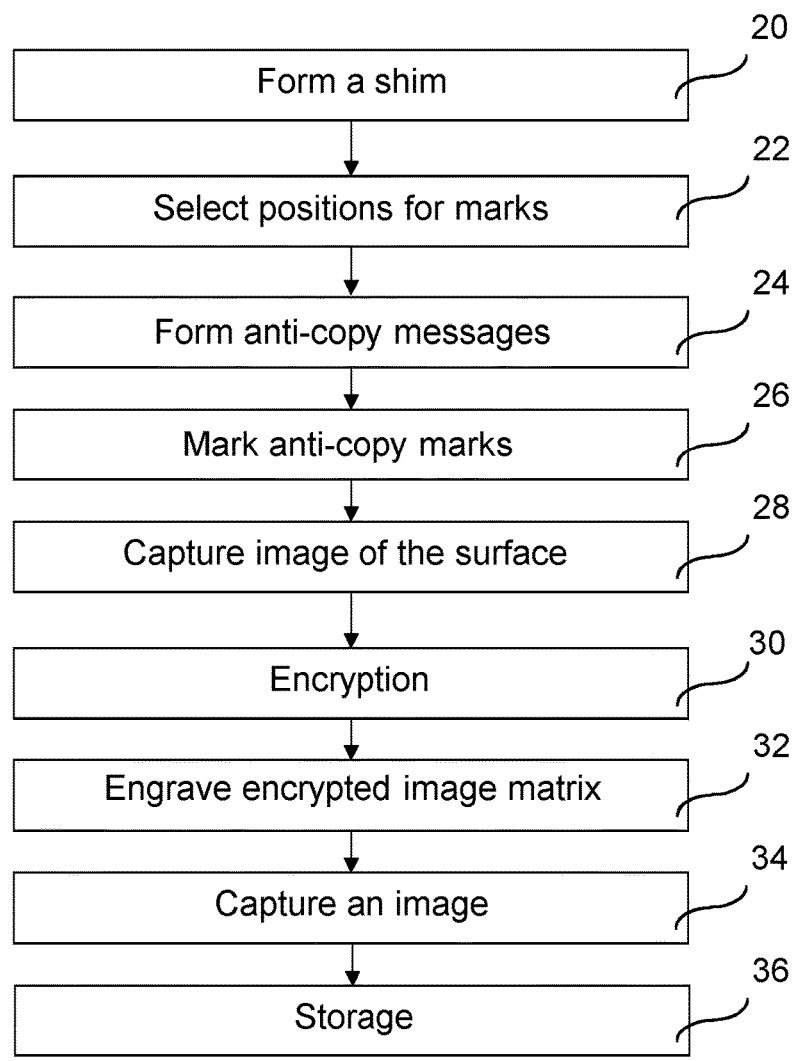
FIG. 2 represents, in the form of a logical diagram, steps in a particular embodiment of the method that is the subject of the present invention.

In embodiments:

the zones 14 and 15 are incorporated into the original digital matrix from which the holographic matrix ("shim") is produced;
 only the low-resolution zone 14 is incorporated into the original digital matrix from which the holographic matrix ("shim") is made, the zone 15 being made by picosecond or femtosecond laser radiation; or
 the two zones 4 and 15 are made onto a holographic matrix without a mark 11 by picosecond or femtosecond laser shot (see FIG. 2).

It is recalled that the duration of a femtosecond laser shot is of the order of (i.e., here, between one-tenth of and ten times) one femtosecond and the duration of a picosecond laser shot is of the order of one picosecond.

FIG. 2 shows a step 20 of forming a holographic matrix from a digital matrix. This holographic matrix is intended to form holograms by printing. In embodiments, the shape of the hologram, or the message carried by the hologram relates to (i.e. one is a function of and depends on the other) at least one of the first and second messages carried by zones 14 and 15. During the step 20, these zones 14 and 15 are therefore not incorporated into the holographic matrix.

During a step 22, a selection of positions for marks 11 is made. For example, these marks are positioned such that the center of each mark 11 forms the vertex of at least one triangle, the lengths of whose sides have predefined ratios.

During a step 24, a digital matrix of an anti-copy mark 15 is made. For example, the second message is encrypted with a public key of a key pair compliant with the PKI asymmetric public key infrastructure. Next, redundancies are added, for example by duplicating the encrypted message of by adding cyclic redundancy codes (CRC). Possibly, code elements permutations are performed.

During a step 26, the anti-copy marks are made on the holographic matrix 10, by at least one picosecond or femtosecond shot. As specified above, this laser mark causes a high error rate, which is unpredictable cell by cell, in the printed anti-copy mark.

During a step 28, at least one image capture is made of a portion of the surface of the holographic matrix carrying at least one anti-copy mark in a zone 15. Next, the image is processed to extract therefrom an error rate for each anti-copy mark and, possibly, a unique identification, e.g. the 2D Fourier Transform of the values found in the anti-copy mark, by retaining the lowest frequency values, e.g. the first five or ten terms in each direction, i.e. 25-100 values.

During a step 30, for each zone 14 surrounding an anti-copy mark 15, an encryption of a first message is performed that depends on the result obtained for this anti-copy mark 15 in step 28. In some embodiments, the first message also depends upon second messages or on results of image processing performed in step 28 for at least one anti-copy mark 15 adjacent to the anti-copy mark 15 that will be surrounded by the zone 14.

During a step 32, for each anti-copy mark 15, a robust encrypted matrix is engraved in the zone 14 that surrounds the anti-copy mark 15.

During a step 34, an image is captured of the holographic matrix carrying the engraved zones 14 and 15.

During a step 36, at least one image captured during a step 28 and/or 34, or data obtained from one of these images, e.g. the unique identifications determined in step 28, is stored.

A high-capacity holographic origination is made on a small format.

The shim (nickel matrix) of a holographic matrix being already ready, small-sized cells comprising 20,000 dots are shot with a femtosecond or picosecond laser The cells whose combination of positions is a graphical code are arranged.

Each cell comprises a unique anti-copy mark.

Each code comprises an item of information about itself and about the neighboring values. A complete code provides information on the neighboring codes (and may make it possible to read them thanks to the redundancies that it comprises).

Some anti-copy marks are chosen and a photo of their environment is taken. Next, the content of this hologram image and the image or content of an anti-copy mark are added into an engraved robust digital matrix. Unlike an anti-copy mark, which may need a close-up image capture using an appropriate lens, this robust digital matrix can be read with a standard tool, e.g. a smartphone.

The authenticity can be checked in this way by direct matching, without accessing a database, and securely. The anti-copy mark also supports a "conventional" authentication.

A resolution sufficient for reading the ripples obtained by a laser shot enables a nanometer-scale authentication (the ripples require a resolution of the order of 240,000 DPI).

For example, an anti-copy mark is marked every seven millimeters.

The invention claimed is:

1. A method of marking a holographic matrix, comprising the steps of:
 forming the holographic matrix, which is configured to produce holograms by printing;
 forming at least one anti-copy mark on the holographic matrix;
 forming at least one copy-robust mark on the holographic matrix; and
 wherein at least one of the steps of forming said at least one anti-copy mark and said at least one copy-robust mark on the holographic matrix implements a laser holographic matrix surface structuring.

2. The method according to claim 1, wherein said at least one anti-copy mark represents a message and a plurality of redundancies of the message carried by said at least one anti-copy mark.

3. The method according to claim 1, wherein the step of forming said at least one anti-copy mark utilizes a picosecond laser.

4. The method according to claim 1, wherein each anti-copy mark formed on the holographic matrix comprises cells and has an error rate, which is unpredictable cell by cell, greater than five percent, compared to a corresponding digital anti-copy mark.

5. The method according to claim 1, wherein a message carried by each copy-robust mark represents an item of information extracted from an image of said at least one anti-copy mark.

6. The method according to claim 5, wherein the message carried by said each copy-robust mark represents a unique identification of said at least one anti-copy mark.

7. The method according to claim 5, wherein the message carried by said each copy-robust mark represents an item of information representative of at least two anti-copy marks or of their respective positions.

8. The method according to claim 1, wherein each copy-robust mark surrounds an anti-copy mark.

9. The method according to claim 1, wherein a shape of a hologram represented by the holographic matrix during the holographic matrix formation step depends on a message carried by said at least one anti-copy mark or said at least one copy-robust mark.

10. The method of according to claim 1, wherein a message carried by a hologram represented by the holographic matrix during the holographic matrix formation step depends on a message carried by the anti-copy mark or by the robust mark.

11. The holographic matrix obtained by implementing the method according to claim 1.

* * * * *